United States Patent [19]

Dalgoutte et al.

[11] 4,398,796
[45] Aug. 16, 1983

[54] OPTICAL FIBRE TERMINATION

[75] Inventors: David G. Dalgoutte, Ilkley; John D. Archer, Hipperholme; Peter F. C. Burke, Leeds; Robert G. Pragnell, Rothwell, all of England

[73] Assignee: International Standard Electric Corporation, New York, N.Y.

[21] Appl. No.: 335,774

[22] Filed: Dec. 30, 1981

Related U.S. Application Data

[63] Continuation of Ser. No. 57,761, Jul. 16, 1979, abandoned.

[30] Foreign Application Priority Data

Aug. 17, 1978 [GB] United Kingdom ............ 33745/78

[51] Int. Cl.³ .............................................. G02B 7/26
[52] U.S. Cl. ................................................ 350/96.20
[58] Field of Search ............... 350/96.15, 96.18, 96.20, 350/96.21, 96.22, 96.25, 96.26

[56] References Cited

U.S. PATENT DOCUMENTS

| | | | |
|---|---|---|---|
| 3,549,233 | 12/1970 | Eaglesfield et al. | 350/96.33 |
| 3,808,549 | 4/1974 | Maurer | 350/96.20 X |
| 3,950,075 | 4/1976 | Cook et al. | 350/96.18 X |
| 3,963,323 | 6/1976 | Arnold | 350/96.22 |
| 3,984,174 | 10/1976 | Landgreen | 350/96.22 |
| 4,026,633 | 5/1977 | Crick | 350/96.21 |
| 4,090,778 | 5/1978 | Phillips et al. | 350/96.20 |
| 4,105,285 | 8/1978 | Bedgood et al. | 350/96.21 |
| 4,135,781 | 1/1979 | Archer | 350/96.20 |
| 4,153,333 | 5/1979 | Harada et al. | 350/96.25 |
| 4,158,477 | 6/1979 | Phillips et al. | 350/96.21 |
| 4,166,668 | 9/1979 | MacLeod | 350/96.20 |

FOREIGN PATENT DOCUMENTS 52-2441 1/1977 Japan ............................... 350/96.21

OTHER PUBLICATIONS

Kapany, *Fiber Optics*, Academic Press, 1967, pp. 5–13.
Witte et al, "A Novel Light Coupling Method for Fibers," *Rev. of Sci. Inst.*, Sep. 1971, pp. 1374–1375.
Few, "Instrument for Testing Telecommunications Optical Fibres," *Optical Engineering*, vol. 15, No. 3, Jun. 1976, pp. 241–243.

*Primary Examiner*—John D. Lee
*Attorney, Agent, or Firm*—John T. O'Halloran; Robert P. Seitter

[57] ABSTRACT

A fibre optic connector of the watch jewel type is provided with a transparent window adjacent the fibre end whereby the fibre is protected from dirt or damage. The window may be provided with a light guiding portion in alignment with the fibre.

5 Claims, 3 Drawing Figures

OPTICAL FIBRE TERMINATION

This is a continuation of application Ser. No. 057,761, filed July 16, 1979, now abandoned.

BACKGROUND OF THE INVENTION

This invention relates to optical fibre transmission systems and in particular to methods and arrangements for terminating the coupling fibres.

Optical fibres, e.g. of the plastics coated silica type, are frequently terminated and coupled by connectors of the watch jewel type. In such a connector an accurately drilled watch jewel receives and aligns the fibre for coupling to a similarly terminated fibre. A frequently encountered problem with this type of connector is the tendency of the fibre end to "grow out" of the jewel bore with the consequent risk of damage to the fibre.

SUMMARY OF THE INVENTION

The object of this invention is to minimize or to overcome the above noted disadvantage.

According to this invention there is provided a termination for a plastics coated optical fibre, the fibre having a bared end portion, the termination including a body having a cylindrical outer reference surface, a coaxial inner bore for receiving the coated fibre, alignment means for locating the fibre end coaxial with the inner bore, and a transparent flat protection window arranged adjacent and normal to the fibre end.

The window causes an incremental loss due to separation of the fibre ends in a mated pair of ferrules. This loss however is acceptably low for large core small numerical aperture fibres.

BRIEF DESCRIPTION OF THE DRAWINGS

Embodiments of this invention will now be described with reference to the accompanying drawings in which.

DETAILED DESCRIPTION OF THE PREFERRED EMBODIMENTS

Figure 1:
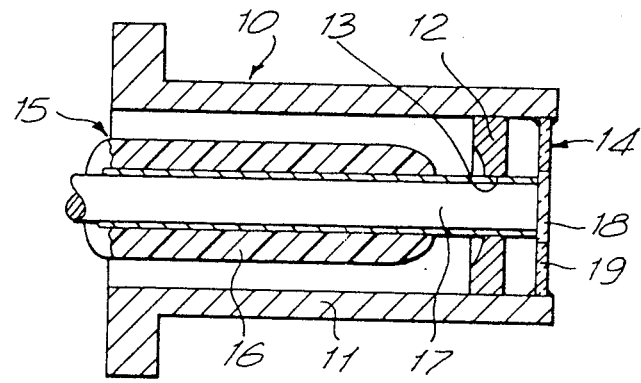
FIG. 1 is a cross section of an optical fibre connector member provided with a protective window.

Referring to FIG. 1, the connector member 10 includes a cylindrical tubular ferrule 11 into one end of which a fibre alignment device, e.g. a bored watch jewel 12, is inserted. The bore 13 of the jewel 12 is accurately concentric with the circumference of the jewel and thus aligns an inserted fibre concentric with the outer surface of the ferrule 11. A thin flat transparent plastics glass or silica window 14 is affixed to the end of the ferrule adjacent the jewel 12 such that the plane of the window is perpendicular to the axis of the jewel bore and the assembly is then vacuum filled with a fluid whose refractive index is matched to that of a fibre to which the connector means is to be fitted. In some applications the window 14, of glass or silica, is of such a diameter to permit insertion into the end of the ferrule 11 where it is secured against the face of the jewel 12 by an adhesive or a ring of fused glass frit.

A plastics coated glass or silica optical fibre 15 to which the connector member is to be fitted is prepared by stripping back the plastics coating 16 to expose the end of the core fibre 17. The fibre 15 is inserted into the ferrule 11 such that the fibre and 17 enters and is located by the jewel bore 13 and the ferrule is then secured to the plastics coating 16 of the fibre e.g. by crimping the ferrule.

The flat window 14 prevents the fibre end from growing out and protects the fibre end from damage while the outer surface of the ferrule 11 provides a reference surface for mating with a similar connector member.

In a particular advantageous arrangement the center portion of the window 14 may comprise a light guiding relatively high refractive index portion 18, the remainder 19 of the window being of lower refractive index. The window may comprise a slice cut from a glass preform, the nominal aperture of which is equal to or greater than the nominal aperture of the fibre to which the connector is fitted. The preform can be made using either the rod-in-tube method or chemical vapor deposition techniques.

Figure 2:
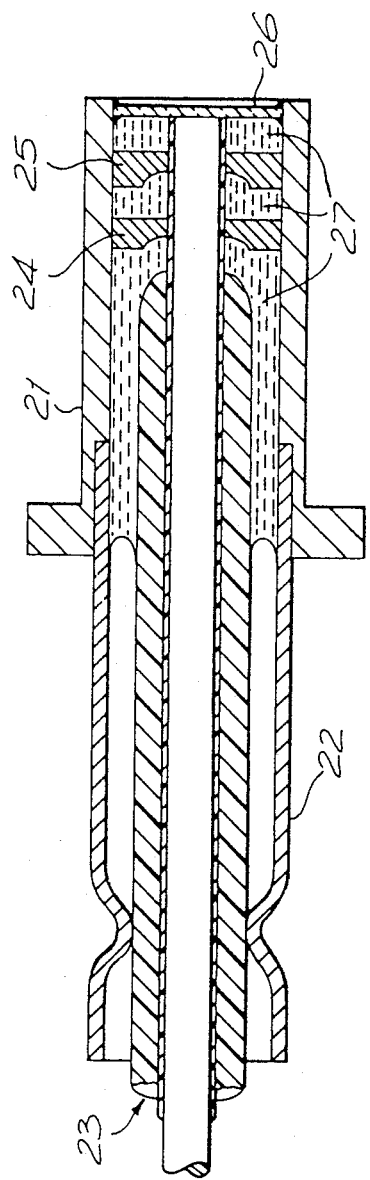
FIG. 2 is a cross section of a modified connector member provided with additional alignment means.

The connector member shown in FIG. 2 provides an auxiliary alignment which aids insertion of the fibre to which it is fitted. In this arrangement a tubular ferrule 21 is provided with a coaxial rear extension tube 22 which tube is crimped on to a plastics coated fibre 23 to which the connector member is fitted, thereby anchoring the connector member to the fibre.

First drilled watch jewel 24 and second drilled watch jewel or similar 25 are fitted into the forward "plug in" end of the ferrule and are enclosed by a thin flat window 26 fitted into or over the ferrule end. The interior of the ferrule is vacuum filled with a refractive index matching fluid 27.

A plastic coated glass or silica optical fibre 23 to which the connector member is to be fitted is prepared as previously described by stripping back a portion of the coating to expose the fibre end and is then inserted through the rearward extension tube 22 and along the ferrule until the fibre end is located in the bore of each jewel, the two jewel arrangements providing very accurate alignment of the fibre. The connector is then anchored to the fibre by crimping the extension tube 22 on to the fibre.

Figure 3:
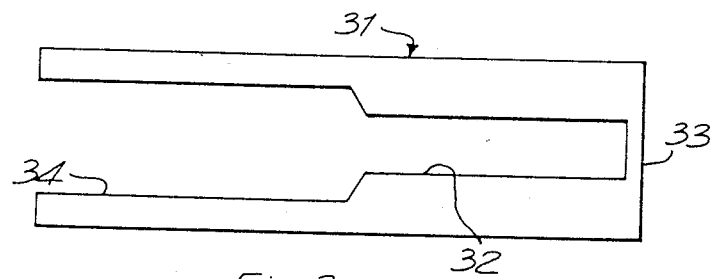
FIG. 3 shows an alignment device for use, e.g. in the connector member of FIG. 2.

FIG. 3 shows a combined alignment and window device which may be machined or molded from a transparent plastics (or glass) material. The device comprises a cylindrical plastics body 31 having an accurately concentric axial bore 32 for receiving and locating the bared end of a plastic coated optical fibre. One end of the bore 2 is closed by a thin layer 33 of the plastics material which acts as a window for light directed along the bore 32. The other end of the bore 32 communicates with an enlarged coaxial bore 34 of a diameter suitable for accommodating the plastics coating of a fibre. In use, the device is mounted in a tubular ferrule, the outer surface of which provides a reference surface for mating with a similar arrangement.

In the arrangements of FIG. 2 and FIG. 3 the center of the window may comprise a light guiding portion as described with reference to the arrangement of FIG. 1.

Whereas this invention has been described with respect to specific embodiments thereof, it will be understood that various changes and modifications will be suggested to one skilled in the art, and it is intended to encompass such searches and modifications as are within the scope of the appended claims.

What is claimed is:

1. The combination of an optical fibre and a termination, said termination comprising a generally cylindrical tubular ferrule having an inner bore of such a diameter as to receive said fibre, at least one watch jewel carried in said bore adjacent one end of said ferrule, said watch jewel having a jewel bore, a flat transparent window carried in said bore between said watch jewel and said one end of said ferrule, said fibre being received in said jewel bore with one end terminating adjacent said window whereby said window resists movement of said fibre if it grows out of said jewel bore, said window having a light guiding portion adjacent said one end of said fibre, said light guiding portion having a higher index of refraction than the remaining portion of said window.

2. The combination as claimed in claim 1 in which the window is selected from the group consisting of plastic, glass or silica.

3. The combination as claimed in claim 1 in which the window is received within the bore by a ring of fused glass frit.

4. The combination as claimed in claim 1 wherein the nominal aperture of the window is at least as large as the nominal aperture of the optical fibre.

5. The combination as claimed in claim 1 wherein a fluid having a refractive index matched to that of the optical fibre is contained within the termination.

* * * * *